United States Patent

[11] 3,534,785

| [72] | Inventor | Andrew Bensen<br>3645 Roanoke St., Seaford, New York 11783 |
|---|---|---|
| [21] | Appl. No. | 739,824 |
| [22] | Filed | June 25, 1968 |
| [45] | Patented | Oct. 20, 1970<br>Continuation-in-part of application Ser. No. 562,275, July 1, 1966. This application June 25, 1968, Ser. No. 739,824 |

[54] VACUUM FILLER BATTERY ACID
6 Claims, 6 Drawing Figs.

[52] U.S. Cl.................................................. 141/41,
141/198, 141/302, 141/309, 141/382, 136/162, 222/209
[51] Int. Cl........................................................ B65b 31/00
[50] Field of Search............................................ 141/14–
–16, 40–41, 46–47, 59–60, 95, 192, 198, 230, 302, 309, 323, 382, 387, 389; 222/209; 136/162; /Inquired classes 136, 137, 103 and 92

[56] References Cited
UNITED STATES PATENTS

| 2,328,415 | 8/1943 | Titus ............................ | 141/41 |
| 2,850,049 | 9/1958 | Lomax ......................... | 141/95 |
| 3,318,345 | 5/1967 | Beall ............................ | 141/59 |

*Primary Examiner*—Herbert F. Ross
*Attorneys*—John C. McGregor, James A. Eisenman and Robert R. Strack ABSTRACT: Apparatus for filling acid into the cells of storage batteries from a reservoir source in which acid discharge means from the reservoir to the cells is through a pair of conduits which terminate in a combination discharge and suction nozzle having a sealing collar and adapted to be inserted into the respective battery cells. One of the tubes is connected through a first check valve to the bellows and the other tube is connected to the bottom of the reservoir which can be vented to the atmosphere. A second conduit including a check valve working in reverse to the first also connects the bellows to the reservoir above the acid level so that, as the bellows is actuated, acid is drawn into the cell to the level of the conduit inserted in the cell.

Patented Oct. 20, 1970

INVENTOR.
Andrew Bensen
BY John C. McGregor &
James A. Eisenman
ATTORNEYS

Patented Oct. 20, 1970

INVENTOR.
Andrew Bensen
BY John C. McGregor &
James A. Eisenman
ATTORNEYS

INVENTOR.
Andrew Bensen
BY
McGregor & Eisenman
ATTORNEYS

VACUUM FILLER BATTERY ACID

This application is a continuation-in-part of application Ser. No. 562,275, filed July 1, 1966.

This invention relates to battery filling devices and more particularly to devices for transferring acid from a sealed acid pack to a battery normally furnished to the retailer with its cells dry.

It is a growing practice in the industry to furnish lead acid type storage batteries with their cells empty, together with a separate, sealed acid pack. At the time of sale, the battery is energized by filling the acid into its several cells. While this practice insures the consumer of a fresh, fully charged battery and, in addition, makes the handling of new batteries safer in transit, it is nevertheless time-consuming to the retailer. Also it exposes the retail shop, garage or station and their personnel to the hazards of spilled acid.

Accordingly, it is one object of the present invention to provide an efficient, inexpensive device for quickly and safely transferring battery acid from a sealed acid pack to the several cells of a battery.

Another object of the invention is to provide a battery acid filling device which virtually eliminates acid spillage.

Still another object of the invention is to provide a battery acid filler by means of which each cell is filled to a precisely predetermined level without danger of overfilling.

In accordance with the present invention, there is provided a battery acid filler including an acid chamber or reservoir, pumping means and hose conduits for accommodating both acid and air. A reservoir filling conduit for connecting a sealed battery acid pack to the unit is provided in the event a separate reservoir is used, although if preferred the acid pack itself can be used as the reservoir. Also connected to the reservoir is an acid discharge conduit which is adapted to be inserted sequentially into the cells of the battery. The discharge conduit includes a nozzle assembly having a resilient sealing collar and, preferably contained within a discharge line, a level-sensing suction line. Mounted on top of the unit is a flexible, resilient bellows formed, for example, of plastic and communicating with the reservoir through a first check valve and connected through a second check valve, operable in the opposite mode to the first, to an air line which passes through the discharge conduit to the nozzle assembly. The acid filling and acid discharge lines are preferably arranged to enter the reservoir through its top and are fitted concentrically within or connected to vertical columns within the reservoir which at once serve to rigidize the structure and provide for acid flow to and from the bottom of the reservoir.

The above and other features and objects of the present invention can be more readily understood having reference to the accompanying drawings in which.

Figure 1:
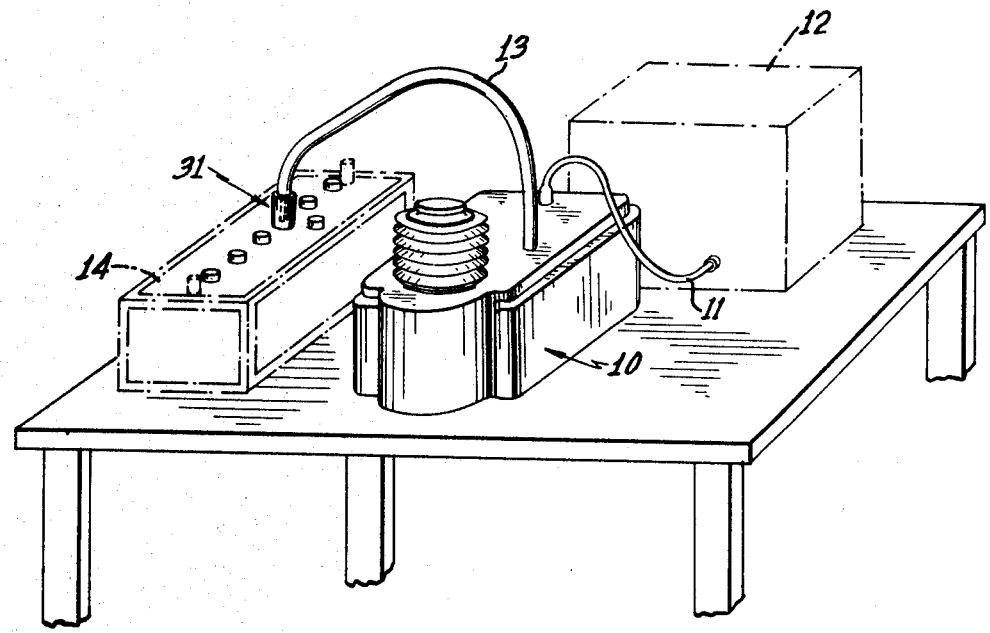
FIG. 1 is a view in perspective showing a typical battery filling setup including, in broken lines, both a battery to be filled and a sealed acid pack normally furnished with a new battery and, in full lines, an acid filling unit formed in accordance with the present invention.
Figure 2:
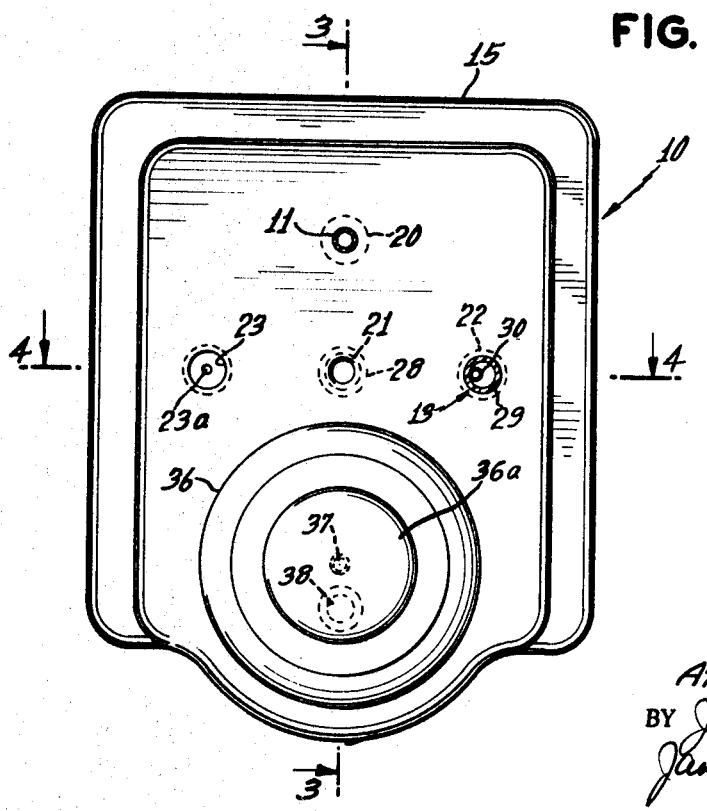
FIG. 2 is a top view of the battery acid filling unit of FIG. 1.

Referring to FIGS. 1—4 of the drawings the invention is shown as embodied in a battery acid filling unit indicated generally by the numeral 10 shown connected through a filling line 11 to a sealed battery acid pack 12 and also connected through a discharge line 13 to a battery 14. It will be understood that the battery acid pack 12 is a conventional container furnished with wet storage batteries which are shipped in a dry state. The acid pack 12 typically takes the form of a rigid but vented outer container formed of corrugated board, for example, and within which the acid is housed in a collapsible plastic bag and is utilized to fill the reservoir of the unit 10.

To fill the reservoir within the unit 10, the filling line 11 is inserted into a suitable fitting 12a normally found on battery acid packs, with the insertion of the line breaking a seal allowing the acid to gravitate out of the pack. The pack 12 can if necessary be held at a higher level to accelerate the acid flow.

The acid within the reservoir of the unit 10 is then pumped into the cells of the battery 14. To this end, and referring to FIGS. 3 and 4 in particular, the unit 10 comprises a basic housing 15 formed of molded plastic such, for example, as polyethylene to define a hollow chamber or reservoir 16. The lower edge of the housing 15 is formed with a contoured rib 17 and, in its bottom surface, with a pair of bosses 18 and 19. The rib 17 and bosses 18 and 19 form foot surfaces on which the unit rests and, in addition, impart rigidity to the structure.

The upper surface of the housing 15 is formed with a series of shouldered recesses or bosses 20, 21, 22 and 23, as well as a large circular opening 24. The acid-filling line or conduit 11 enters the housing through the boss 20 which is vertically aligned with the boss 18 in the lower surface. The flexible portion of the filling line 11 is joined to a rigid tube section 11a establishing a liquid connection from the line 11 into the reservoir 16 and a collar 26 secures the tube section 11a in place so that it can swivel to accommodate various relative positions of the acid pack. The discharge line 13 enters the housing 15 through the boss 22 in sealing relationship and extends to the bottom of the reservoir 16 where it passes through an anchoring slot 27 in the lower end of a tubular support member 28 held at its upper end by the boss 21 and in its lower end by the boss 19. A channel 15a in the bottom of the housing accomodates the horizontally disposed lower end of the filling line 13.

Figure 3:
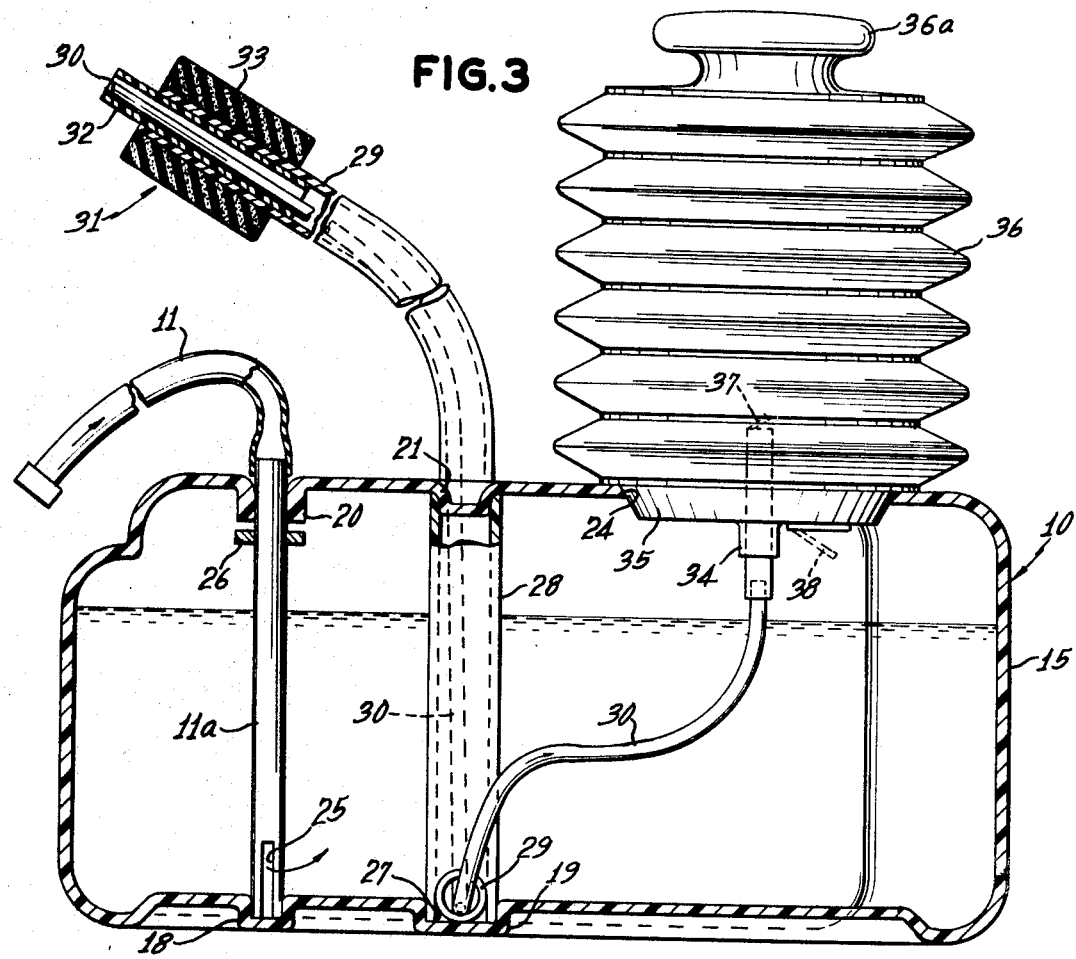
FIG. 3 is a view in side elevation taken on the line 3—3 looking in the direction of the arrows.

The filling line assembly 13 includes a flexible outer tube 29 through which passes a flexible inner tube 30 of substantially smaller diameter. As best seen in FIG. 3, the inner and outer tube assembly terminates at its free end in a filling nozzle 31 including a short, rigid pipe section 32 sealed concentrically within the outer flexible tube section 29 and through which the inner tube 30 passes. The inner tube 30 is secured eccentrically within the rigid section 32 and terminates at a point flush with the end thereof. A soft rubber sealing collar 33 surrounds the tube section 32 and the adjacent portion of the outer tube 29. That portion of the rigid tube 32 and inner tube 30 which projects beyond the sealing collar 33 is adapted, as best seen in FIG. 1, to be inserted successively into the cells of the batteries to be filled with acid.

If desired, suitable clamping means or other holding devices can be used to anchor the nozzle 31 in the battery with the collar 33 in sealing relationship therewith, although normally such is not required. When the filling nozzle 31 is not in use it can be rested in the holding boss 23 (FIGS. 2 and 4) formed at the top of the housing, with a drain hole 23a being provided to permit residual acid in the nozzle to drain back into the reservoir 16.

Figure 4:
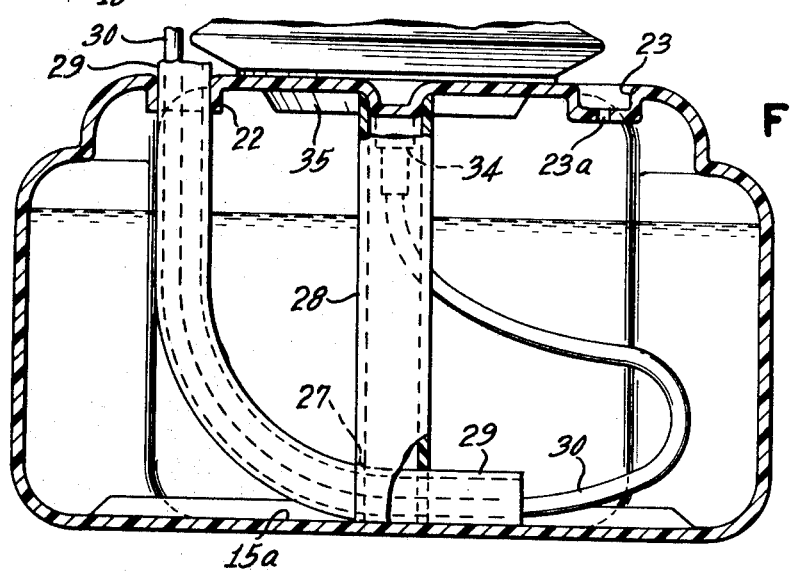
FIG. 4 is a view in end elevation taken on the line 4—4 of FIG. 2 looking in the direction of the arrows.

As best seen in FIGS. 3 and 4, the inner end of the inner tube passes out of the inner end of the outer tube 29 at the base of the reservoir and extends in one continuous pass upwardly into a fitting 34 anchored in the rigid base 35 of a flexible, resilient bellows 36. The bellows is secured to the housing 15 by means of its base 35 which is secured in the circular opening 24 in the top of the housing. The upper end of the fitting 34 terminates within the bellows 36 in an intake valve 37 which can take the form, for example, of a soft, flexible, plastic disk joined at one point near its circumference, as by heat welding, to a point on the circumference of the rigid fitting 34. Formed in the base 35 of the bellows is an exhaust valve 38 placing the interior of the bellows in communication with the reservoir 16, the valve 38 also taking the form of a soft, flexible, plastic disk overlying an exhaust hole 38a in the bellows base and also secured at one point, as by heat sealing, to form its hinge.

In operation, when the bellows is compressed by manual pressure downwardly on the handle 36a, the intake valve 37 is driven shut to seal off the tube 30 and the exhaust valve 38 is driven open to vent the fluid within the bellows into the reservoir 16 which is, in turn, vented to atmosphere at its top through the hole 23a, as well as through holes 15a in the upper edge of the housing. Assuming the reservoir 16 is at least partially filled with acid and the nozzle assembly 31 is in sealing engagement against the open top of a cell of the battery, the depressed or flattened bellows 36 is released enabling it, by virtue of its natural spring force, to expand. This draws the exhaust valve 38 closed and the intake valve 37 open to pull air from the cell of the battery through the inner tubing 30 and into the expanding bellows. Atmospheric pressure impinging on the surface of the reservoir will thereupon force acid through the larger tube 29 into the cell of the battery. When the acid reaches an upper level in the battery cell (as determined by the length of the tip of the nozzle assembly 31) acid will be pushed from the cell at the same rate at which it enters and a constant level will be attained. The nozzle assembly thereafter is moved to the next cell of the battery and the cycle repeated until all cells are filled.

Figure 5:
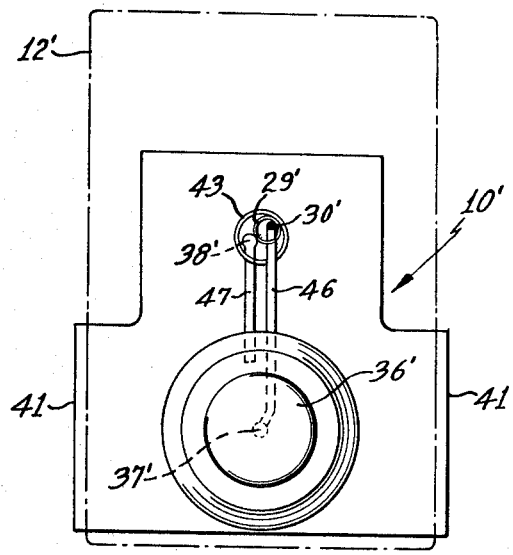
FIGS. 5 and 6 are top and side views respectively of another embodiment of the invention.
Figure 6:
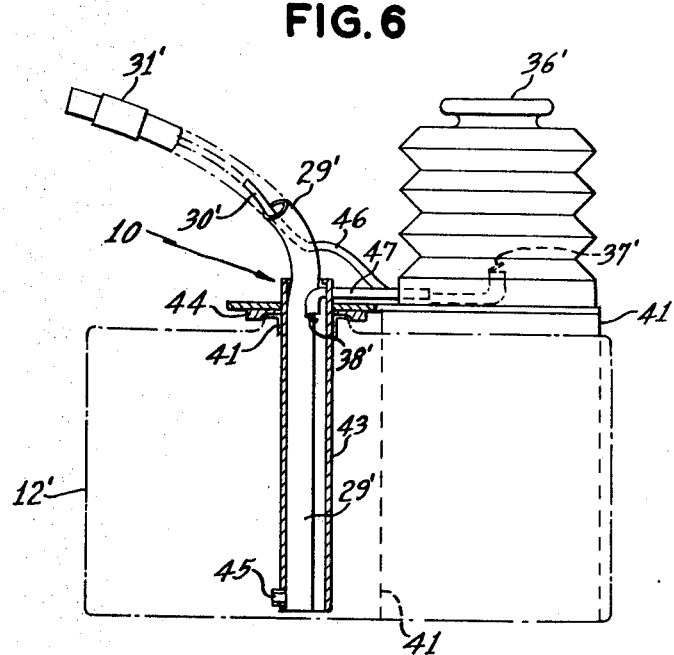

Referring to FIGS. 5 and 6, there is illustrated another embodiment of the invention in which the container comprising the acid shipping pack 12' is also used as the reservoir. In this arrangement, components and elements corresponding to those of the embodiments of FIGS. 1—4 are identified by like primed reference numerals. The assembly 10' includes an upper support surface 40 which can rest on the top of the acid pack 12' and, if desired, can include supplemental supporting legs 41 to relieve the acid pack of pumping forces.

The acid pack 12' is formed with an enlarged access opening 42 which can be sealed by a fixed membrane and a covering cap (not shown), both of which are adapted to be removed when the acid pack is to be tapped. The access opening 42 can also, if desired, be used as the original inlet or filling opening. Inserted into the access opening 42 after the cap and membrane have been removed is a vertical plastic tube 43, preferably formed with a shoulder 44 adapted to overlie the wall defining the access opening 42. The plastic conduit 29' which connects to the filling head 31', all as described above, passes into the vertical tube 43 with substantial clearance and terminates at the bottom in an opening 45 which communicates with the bottom of the reservoir. The flexible inner tube 30' from the filling head assembly 31' again passes within the flexible outer tube 30' but, rather than passing to the bellows 36' through the reservoir as described above, is shunted off at a point above the reservoir in a conduit section 46 which communicates with the inside of the bellows 36' through the intake valve 37'. The space within the bellows 36' is also vented to the reservoir through the exhaust valve 38' which, in this embodiment, is disposed within the large vertical tube 43. A short conduit 47 joins the exhaust valve 38' with the inside of the bellows.

It will be understood that the acid pack reservoir 12' can include either a fixed imperforate inner liner, in which case the reservoir vents to the atmosphere through the top of the tube 43, or an inner liner in the form of a collapsible battery connected to the access opening 42, in which case it is preferred that the container holding the battery acid includes vents to the atmosphere. The operation is the same as that described above.

While the invention has been described above having reference to preferred embodiments thereof, it will be understood that it can take various other forms and arrangements within the scope of the invention. For example, the tube 43 of FIGS. 5 and 6 need not necessarily extend to the bottom of the reservoir, although the conduit 29' should. The invention should not, therefore, be regarded as limited except as defined by the following claims:

I claim:

1. Apparatus for filling acid into storage battery cells from a housing forming an acid reservoir, acid discharge means to connect the reservoir to the battery cell including a pair of conduits terminating in a combination discharge and suction nozzle adapted to enter the upper end of the battery cell, a sealing collar surrounding the nozzle to engage the surface of the battery around the cell opening, mounting means to dispose the end of the first of the conduits adjacent the bottom of the reservoir, bellows means connected to the housing, means including a first check valve connecting the bellows to the reservoir for the passage of fluid from the interior of the bellows into the reservoir and adapted to close under the influence of subatmospheric pressures within the bellows, means including a second check valve connecting the second of said pair of conduits of the acid discharge means to the interior of said bellows and adapted to open under the influence of subatmospheric pressures within the bellows, whereby when the bellows is actuated fluid therein is driven through the first check valve into the housing, and means to vent the housing to the atmosphere, whereby further actuation of the bellows evacuates the battery cell through the second of said pair of conduits causing atmospheric pressure to force acid into the cell through the first of said conduits until such time as the cell is filled to the level established by the position of the second conduit in the cell.

2. Apparatus as set forth in claim 1, said bellows being resiliently biased to a position in which its volume is maximized and adapted to be manually compressed to decrease the volume.

3. Apparatus as set forth in claim 1, said second conduit being disposed within the first said conduit passing through the open end of the first conduit near the bottom of the reservoir and passing upwardly through the reservoir to the bellows.

4. Apparatus as set forth in claim 3, including a rigid vertical member disposed generally centrally within the reservoir and connecting the upper and lower surfaces of the housing, the upper end of the rigid member terminating adjacent the bellows whereby downward compression forces on the bellows are distributed through the rigid member to the base of the reservoir, and means forming an opening through the rigid vertical member adjacent the bottom of the reservoir through which the pair of conduits pass, whereby the first conduit is secured near the bottom of the reservoir.

5. Apparatus as set forth in claim 4, including means to fill acid into the reservoir comprising a flexible hose disposed externally of the housing and terminating adjacent the upper surface thereof, and a rigid vertical tubular member connected to the flexible hose adjacent the top of the housing disposed within the reservoir, means to secure the member to both the top and bottom of the housing, and means to define an acid discharge opening in the member near the bottom of the reservoir.

6. Apparatus as set forth in claim 1, the housing including an access opening in its top, a vertical tubular member fitted in the opening and communicating with the reservoir, the first of said pair of conduits passing into the reservoir through the tubular member and extending substantially to the bottom thereof, said first check valve being disposed in the tubular member, and means connecting the first check valve to the inside of the bellows.